United States Patent
Nicholas et al.

(10) Patent No.: US 9,695,878 B2
(45) Date of Patent: Jul. 4, 2017

(54) PLUG-IN PROPSHAFT ASSEMBLY TOOL

(71) Applicant: FORD GLOBAL TECHNOLOGIES, LLC, Dearborn, MI (US)

(72) Inventors: Chris P. Nicholas, Milford, MI (US); Scott L. Wilson, Lexington, MI (US); Scott D. Denny, Hudson, WI (US); Martin Smets, LaSalle, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 14/795,131

(22) Filed: Jul. 9, 2015

(65) Prior Publication Data
US 2017/0008138 A1    Jan. 12, 2017

(51) Int. Cl.
| | |
|---|---|
| *B23P 19/08* | (2006.01) |
| *F16D 1/116* | (2006.01) |
| *F16D 1/06* | (2006.01) |
| *B23P 19/02* | (2006.01) |
| *F16D 1/10* | (2006.01) |

(52) U.S. Cl.
CPC .............. *F16D 1/116* (2013.01); *B23P 19/02* (2013.01); *F16D 1/06* (2013.01); *F16D 2001/103* (2013.01)

(58) Field of Classification Search
CPC .......... B23P 19/084; F16D 1/116; F16D 1/06; F16D 2001/103
See application file for complete search history.

(56) References Cited

U.S. PATENT DOCUMENTS

| | | | |
|---|---|---|---|
| 6,902,135 B2 * | 6/2005 | Boucher | B65H 23/32 226/110 |
| 7,377,854 B2 | 5/2008 | Wormsbaecher | |
| 7,553,238 B2 | 6/2009 | Wormsbaecher et al. | |
| 7,712,994 B2 | 5/2010 | Cermak | |
| 7,867,099 B2 | 1/2011 | Szentmihalyi et al. | |
| 8,025,454 B2 | 9/2011 | Cermak | |
| 8,220,581 B2 | 7/2012 | Buchwitz et al. | |
| 8,784,220 B1 | 7/2014 | Katke | |
| 2014/0121029 A1 | 5/2014 | Oh | |

* cited by examiner

*Primary Examiner* — John C Hong
(74) *Attorney, Agent, or Firm* — James Dottavio; MacMillan, Sobanski & Todd, LLC

(57) ABSTRACT

A plug-in constant velocity (CV) joint is assembled to a powertrain component using a power tool. The CV joint and powertrain component connect via a splined shaft coupling with a snap ring interlock. External bi-directional thrust features on the joint and component engage first and second arms of the power tool after the splined shaft coupling is partially inserted by hand. The arms are relatively movable along a longitudinal direction, and an actuator selectively applies a compression force to the bi-directional thrust features adapted to fully insert the splined shaft coupling and engage the snap ring interlock. The power tool monitors the compression force to detect the full insertion. The actuator automatically applies a predetermined expansion force to the bi-directional thrust features to verify engagement of the snap ring interlock, wherein the predetermined expansion force is less than a force sufficient to disengage the snap ring interlock.

9 Claims, 6 Drawing Sheets

PLUG-IN PROPSHAFT ASSEMBLY TOOL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to assembly of powertrain components including a plug-in constant velocity joint, and, more specifically, to a power tool and the provision of mechanical features on the powertrain components for engaging the power tool to ensure complete coupling of the components via a snap ring interlock.

Propshafts (e.g., driveshafts and half-shafts) are used in motor vehicles to transmit rotational power between various powertrain components, such as between a transmission or a power transfer unit (PTU) at one end and an axle or a rear drive unit (RDU) at the other end. Each connection of the propshaft to another powertrain component may typically include a constant velocity (CV) joint. To facilitate the assembly process between a CV joint and the other powertrain component (e.g., a PTU, RDU, or axle), a plug-in CV joint has become commonly used as shown in U.S. Pat. No. 8,784,220 and U.S. patent application publication 2014/0121029A1, for example. In a plug-in CV joint, conventional threaded fasteners are replaced by a self-connecting interlock such as a snap ring or circlip which automatically engages when a splined shaft of one component (e.g., of a transmission) becomes fully inserted into a splined bore of the other component (e.g., of the CV joint).

During assembly of a powertrain on an assembly line in a vehicle assembly plant, a propshaft component having a plug-in CV joint on one or both ends has typically been manually attached with the mating powertrain components. A fixture known as a moon buggy supports and aligns the powertrain components as the powertrain is assembled on a subframe for subsequent integration with a vehicle body. Depending on the component sizes, manufacturing tolerances, and other factors, the manual insertion forces may sometimes be undesirably high for a manual operation. Moreover, a manual verification of the successful coupling together of the components may sometimes be difficult to perform. It would be desirable to provide a robust verification of the interconnection without manual intervention.

SUMMARY OF THE INVENTION

In one aspect of the invention, an apparatus comprises a plug-in constant velocity (CV) joint attached to a propshaft, wherein the CV joint has a first bi-directional thrust feature accessible from outside the CV joint. A rotating powertrain component is configured to connect with the CV joint via a splined shaft coupling with a snap ring interlock that engages when the splined shaft coupling is fully inserted. The powertrain component has a second bi-directional thrust feature accessible from outside the powertrain component. A power tool has a first arm adapted to engage the first bi-directional thrust feature and a second arm adapted to engage the second bi-directional thrust feature after the splined shaft coupling is partially inserted. The arms are relatively movable along a longitudinal direction, and an actuator selectively applies a compression force to the bi-directional thrust features adapted to fully insert the splined shaft coupling and engage the snap ring interlock by contracting the first and second arms. The power tool monitors the compression force to detect the full insertion. The actuator automatically applies a predetermined expansion force to the bi-directional thrust features to verify engagement of the snap ring interlock, wherein the predetermined expansion force is less than a force sufficient to disengage the snap ring interlock. As used herein, the term "bi-directional thrust feature" means that a combination of flange(s), channel(s), and/or socket(s) provide radial bearing surfaces used by the power tool to apply bi-directional forces to the CV joint and the powertrain component along the axis of the splined shaft coupling. Two bearing surfaces on each component facing opposite longitudinal directions can be provided by a single flange, channel, or socket or by a combination of such features.

DETAILED DESCRIPTION OF PREFERRED EMBODIMENTS

Figure 1:
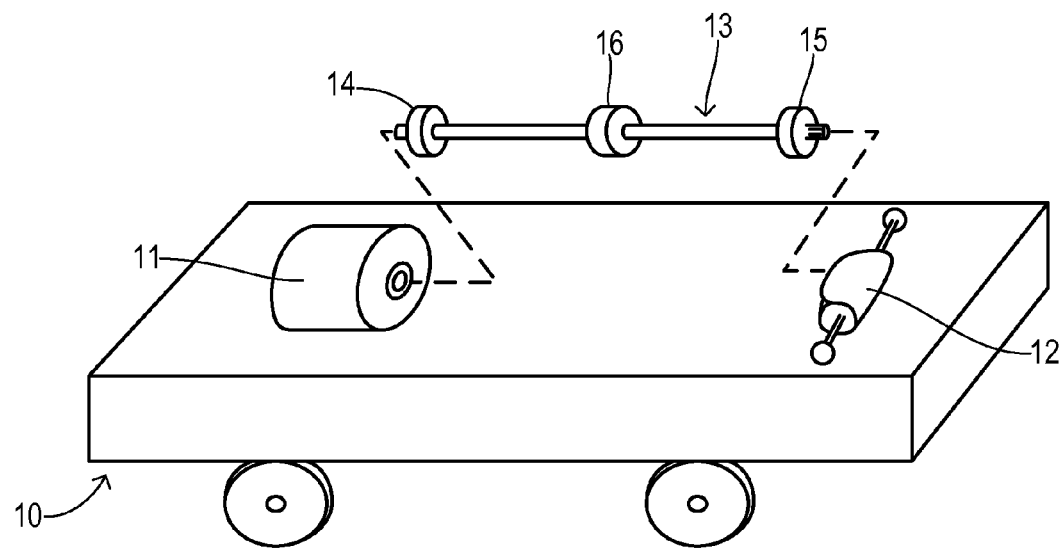
FIG. 1 is a perspective view of an assembly fixture and drivetrain components.
Figure 2:
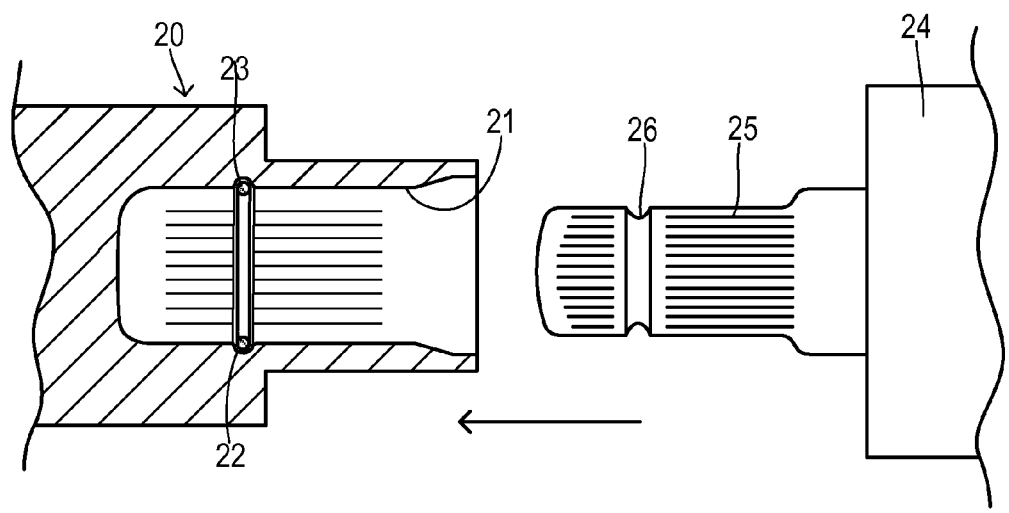
FIG. 2 is partial cross-sectional view showing a splined shaft coupling for a plug-in CV joint.

Referring to FIG. 1, a movable fixture 10 is shown supporting a power transfer unit 11 and a rear drive unit 12 to be interconnected by a driveshaft assembly 13 having CV joints 14 and 15 at opposite ends and a center support 16, in a general configuration as known in the art. FIG. 2 shows one common arrangement for a plug-in coupling wherein a CV joint 20 includes a splined bore 21 with a circumferential groove 22 receiving a snap ring or circlip 23. A second powertrain component 24 such as a rear drive unit or an axle assembly includes a splined shaft 25 with a circumstantial groove 26 adapted to receive circlip 23 upon complete insertion of the splined shaft coupling (i.e., when groove 26 reaches groove 22 so that circlip 23 becomes captured in both grooves). In a known manufacturing process, CV joint 20 has been manually plugged into component 24 by sliding together splined shaft 25 and splined bore 21 until the snap ring interlock becomes engaged.

Figure 3:
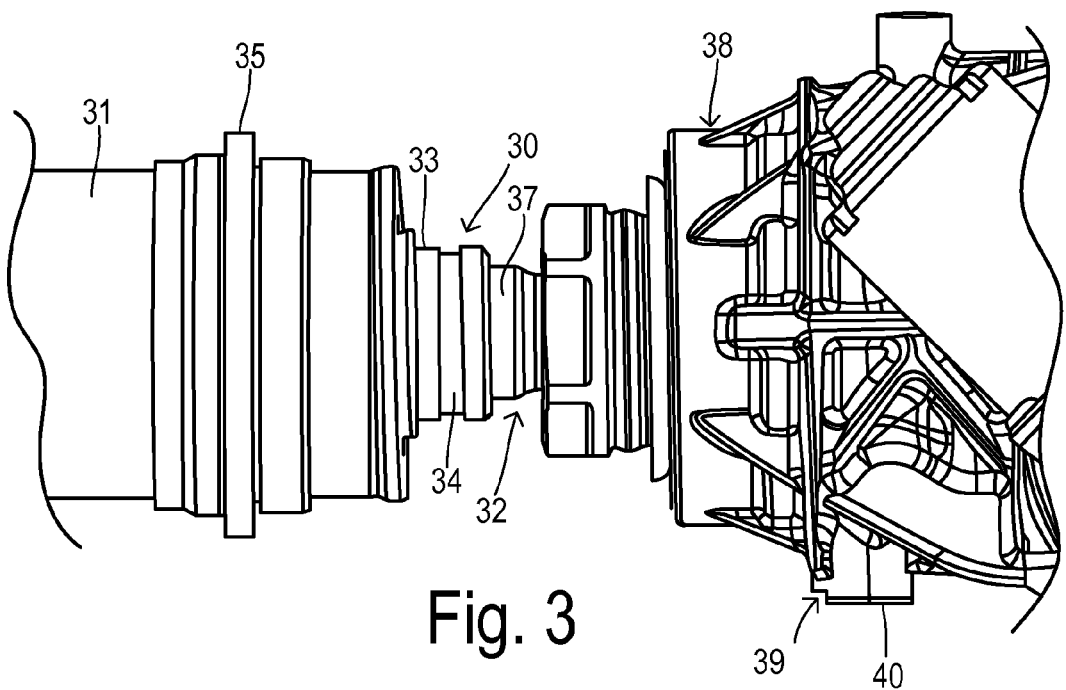
FIG. 3 is a side view of a CV joint and powertrain component having bi-directional thrust features for engaging an assembly tool according to one preferred embodiment of the invention.

To make the assembly process more robust and to avoid limitations associated with manual installation such as high insertion forces and the need for reliable verification of a successful interlock, the present invention provides an assembly tool together with associated features on the powertrain components themselves for interfacing with the power tool. The plug-in interface in the present invention preferably utilizes a splined shaft coupling wherein either of the joined components can provide a splined shaft while the other component provides a splined bore. As shown in FIG. 3, for example, a CV joint 30 which is mounted to the end of a driveshaft tube 31 may include a splined bore while powertrain component 32 provides a splined shaft. The specific details of the splined shaft coupling and the snap ring interlock can be in accordance with any desired configuration. The power tool of the present invention interfaces with the external or outside surface of the powertrain components in order to provide the necessary forces for installing the CV joint and for reversing the applied force in order to verify a successful installation. As shown in FIG. 3, CV joint 30 may include a collar 33 having the splined bore on the inside and having at least one bi-directional thrust feature accessible from outside CV joint 30. The thrust feature may be comprised of a groove 34 formed in collar 33, for example. In addition or alternatively, the thrust feature may include a flange 35 extending radially from an outer surface of CV joint 30 for interfacing with the power tool (not shown). The thrust features on each component provide at least two bearing surfaces extending radially from the shaft axis and with one surface facing in each longitudinal direction along the shaft so that both contraction and expansion forces can be applied by the power tool.

The second powertrain component 32 may include a splined shaft 37 extending from a main housing 38 which includes a boss 39 including a socket 40 to be engaged by a different portion of the power tool (not shown). By providing bi-directional thrust features on each of the powertrain components, the power tool is able to apply a compression force during insertion of the splined shaft coupling and to automatically apply an expansion force during verification of a successful interlocking as described below.

Figure 4:
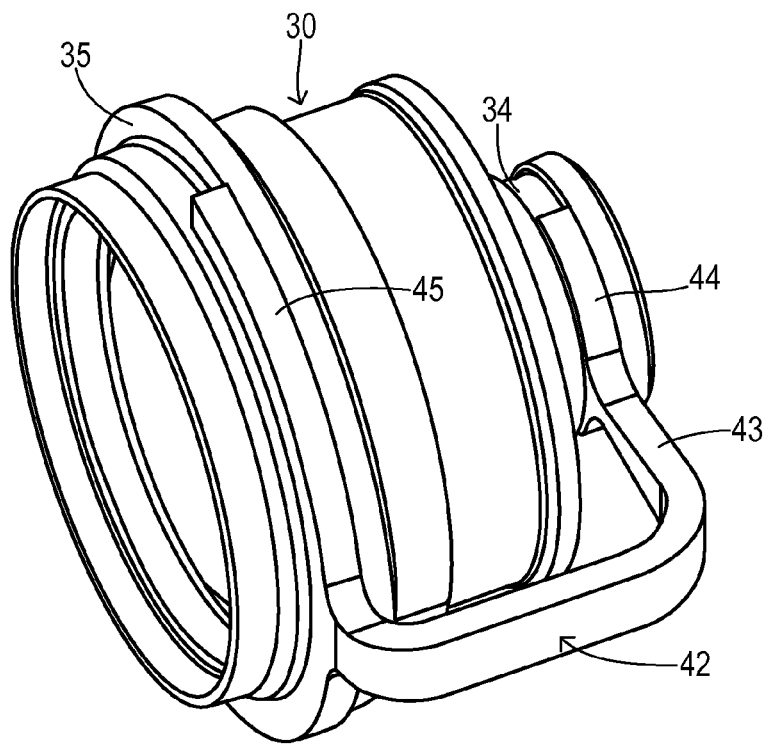
FIG. 4 is a perspective view showing a CV joint and a portion of an is assembly tool.

FIG. 4 shows CV joint 30 together with a first grasping portion 42 for an assembly tool. To provide for convenient manual use of the assembly tool, one or more arms on the grasping portion of the tool are adapted to engage the bi-directional thrust features by slipping the arms into or around the thrust features without requiring moving parts. Thus, first grasping portion 42 includes an arm 43 having an arcuate cradle 44 at its distal end for being captured in groove 34. Arcuate cradle 44 extends radially over no more than 180° within groove 34. Grasping portion 42 may also have a second arcuate cradle 45 that is adapted to abut flange 35 for providing a more stable interface between grasping portion 42 and CV joint 30.

Figure 5:
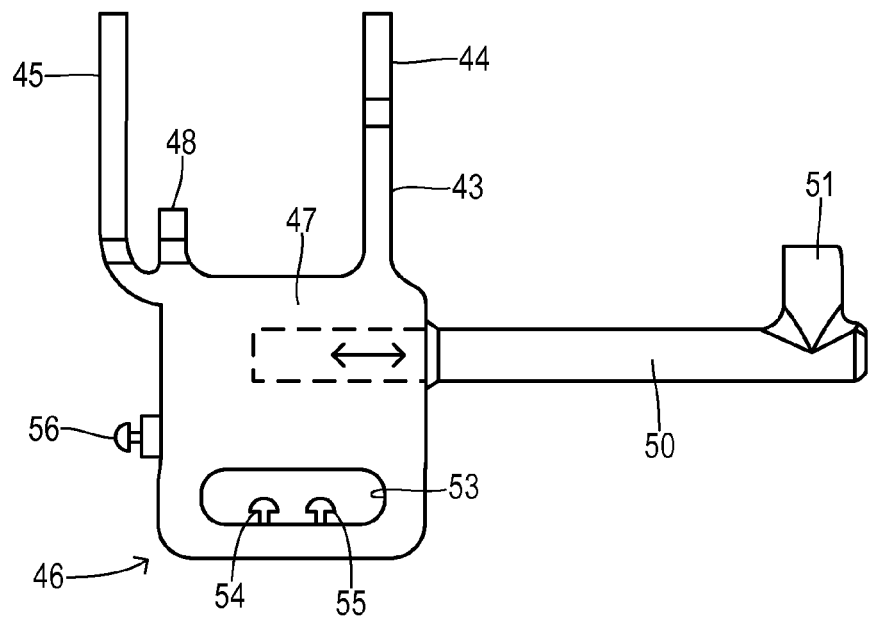
FIGS. 5-7 are side, end, and top views of an assembly tool according to one embodiment.
Figure 6:
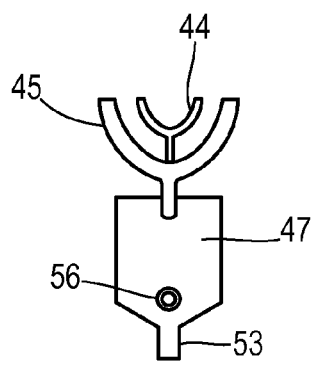
Figure 7:
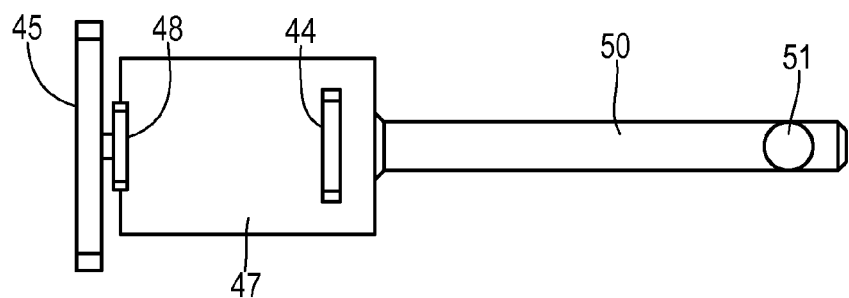
Figure 10:
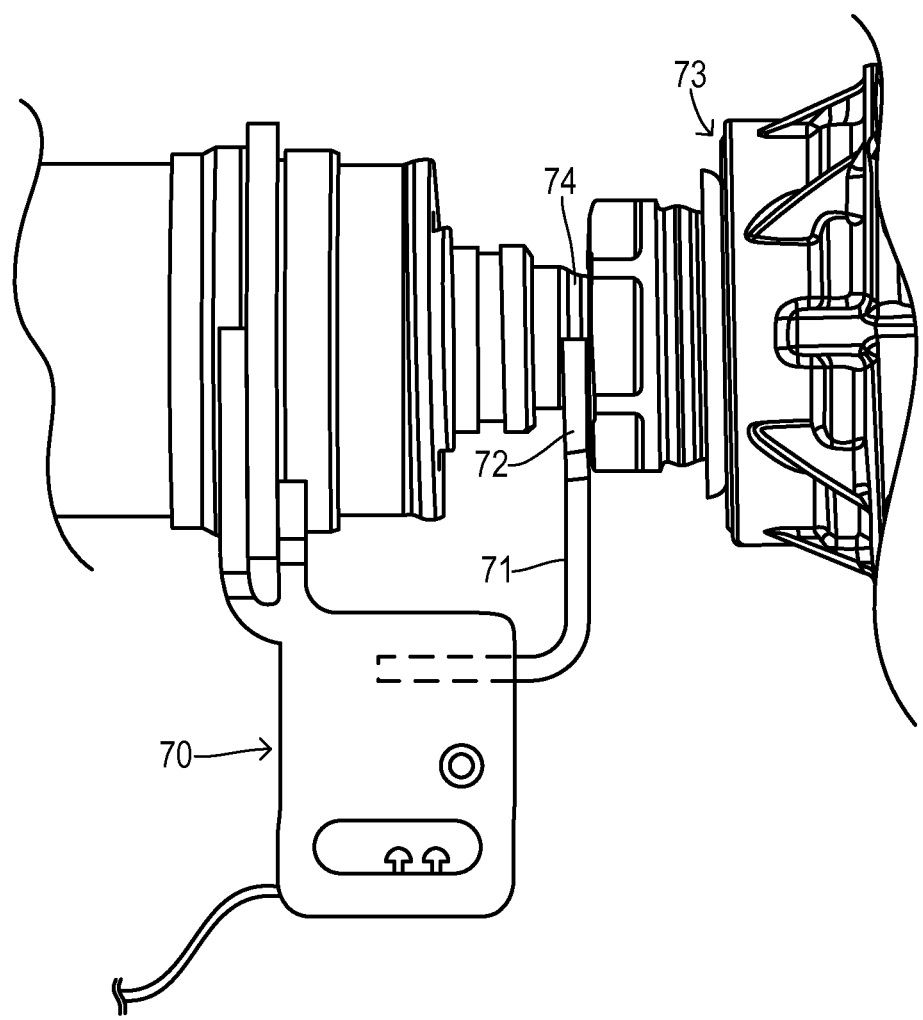
FIG. 10 is a side view showing an alternative embodiment for bi-directional thrust features and a power tool.

FIGS. 5-7 show a power tool 46 for assembling a plug-in CV joint wherein first arm 43 and arcuate cradle 44 are integrated into a tool housing 47. Additional arms and/or cradles may be provided to increase stability, such as cradles 45 and 48 for interfacing with opposite sides of flange 35. Power tool 46 has a second arm 50 for engaging the second powertrain component. Arm 50 is relatively movable with respect to housing 47 and first arm 43. In this embodiment, arm 50 has a post 51 at its distal end for engaging socket 40 of the second bi-directional thrust feature on powertrain component 32. FIG. 10 shows an alternative embodiment for a power tool 70 wherein the second arm 71 comprises a cradle 72 to be received by powertrain component 73 in a channel 74, instead of the post and socket as shown in the preceding embodiment.

Figure 8:
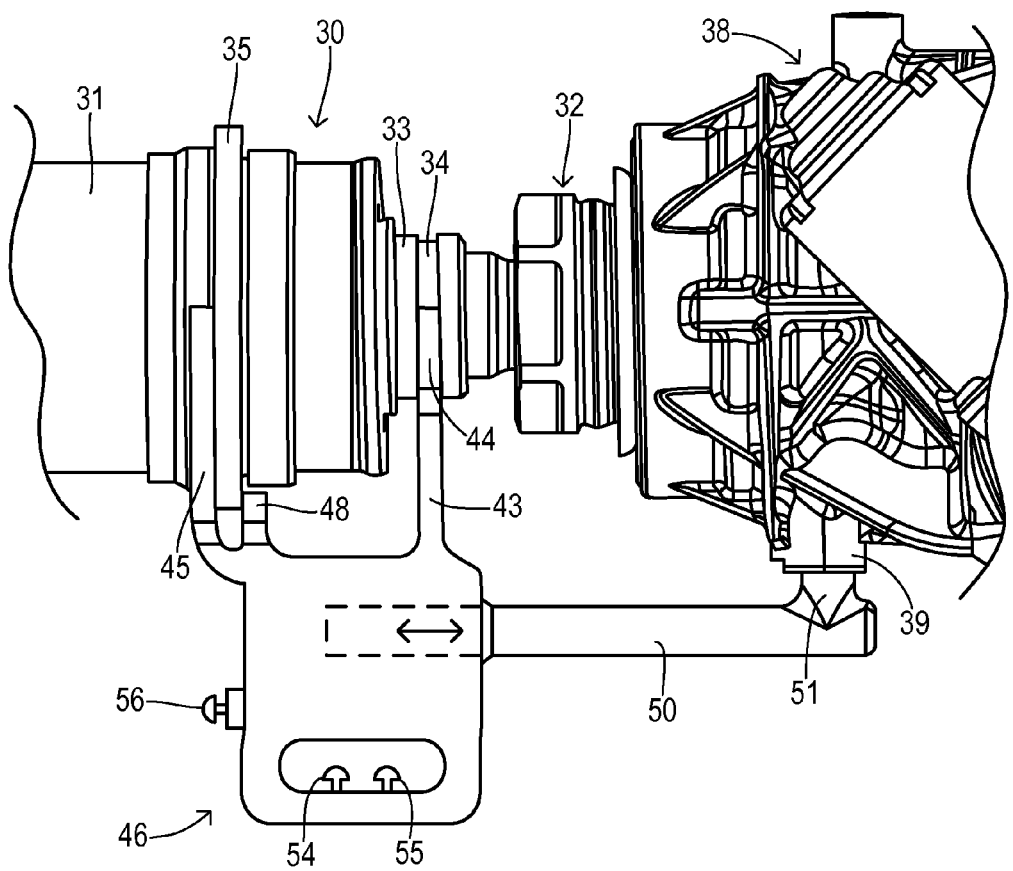
FIG. 8 is a side view wherein an assembly tool of the invention is showing engaging a CV joint and powertrain component to assist in making a full insertion of a splined shaft coupling.

Second arm 50 performs a telescoping movement into and out of tool housing 47 under control of an actuator and control circuitry described below. Housing 47 also provides a manual grip 53 and a plurality of operator controls including expansion/contraction control switches 54/55 and a trigger switch 56. The distance between post/arm 51 and cradles 45 and 44 is manually adjustable using control switches 54/55 to align each of the arms, cradles, and/or socket posts with the bi-directional thrust features in order to attach power tool 46 onto the components after the assembly operator has manually inserted the splined shaft coupling partially together. Placement of tool 46 is shown in FIG. 8. After power tool 46 is assembled onto the CV joint and powertrain component in the partially assembled state, the assembly operator actuates trigger 56 to initiate an automated process for completing insertion of the splined shaft coupling and for verifying a successful interlocking of the components.

Figure 9:
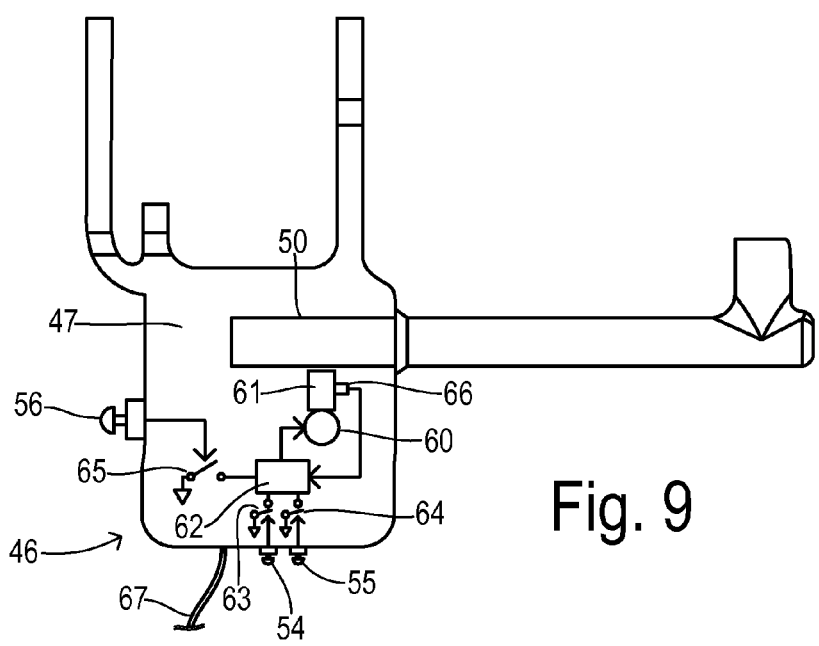
FIG. 9 shows an actuator and control elements of an assembly tool.

Power tool 46 is shown in greater detail in FIG. 9. An actuator motor 60 (such as a stepper motor or other servo motor) is coupled with arm 50 by a linkage 61 which may include appropriate gearing, for example. A microcontroller 62 is connected with motor 60 and includes various inputs responsive to toggle contacts 63-65 of control switches 54 and 55 and trigger 56, respectively, in order to initiate respective actions by controller 62. A torque/force sensor 66 arranged in conjunction with linkage 61 or motor 60 provides a sensor signal which is input to microcontroller 62. In addition to the torque or force being applied to arm 50, microcontroller 62 monitors the position of arm 50 (i.e., to determine the distance between the respective thrust features). The position monitoring may be inherent in the structure of motor 60 or sensor 66 may also include a position sensor such as a shaft encoder, for example. The actuator/control elements of power tool 46 may be powered via an external cable 67. In addition, power tool 46 may be suspended from a cable support system to facilitate use by the assembly operator as known in the art.

Figure 11:
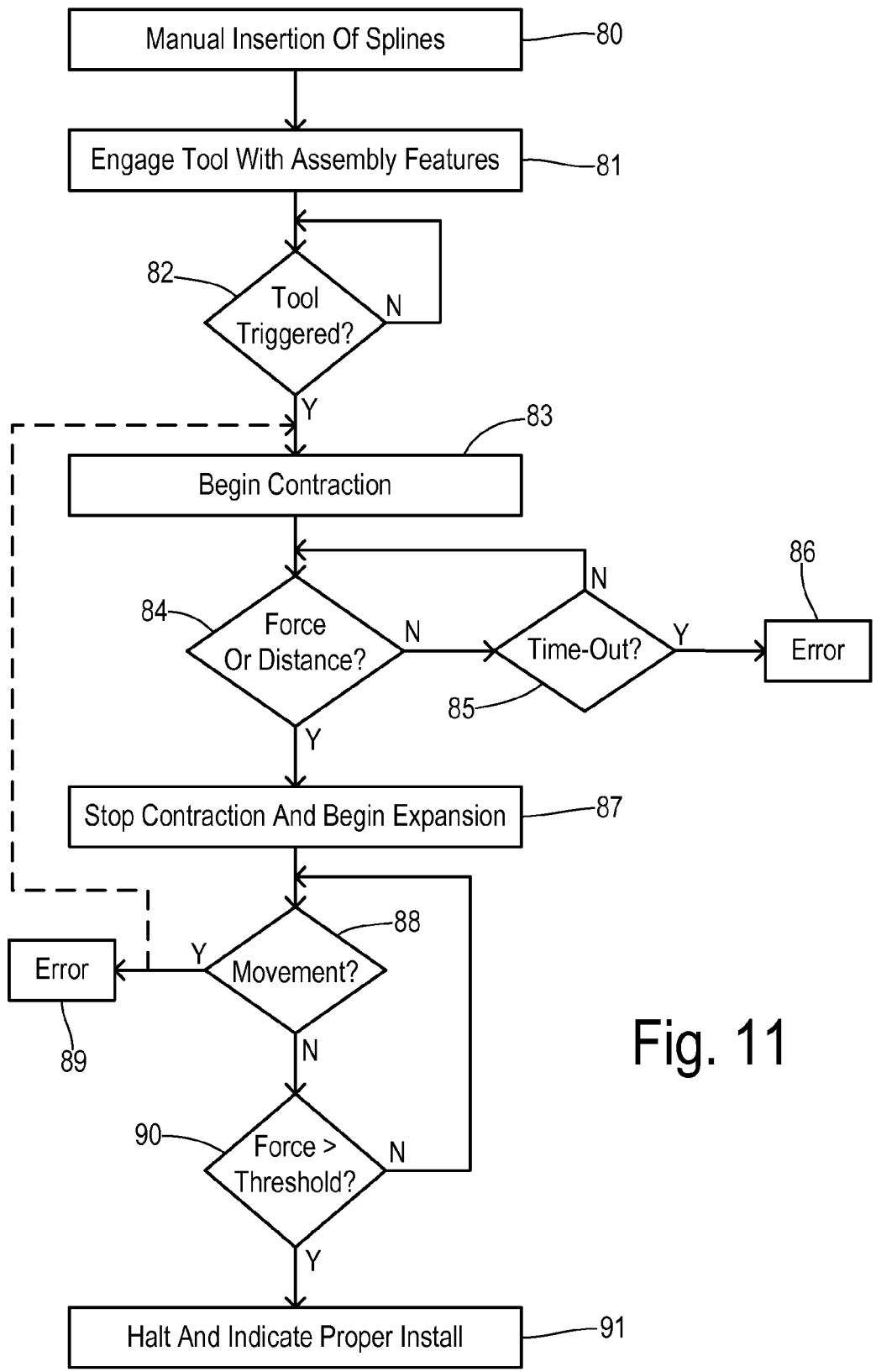
FIG. 11 is a flowchart showing one preferred method of the invention.

FIG. 11 shows a preferred method of the invention wherein an operator manually inserts the splined shaft connection so that the CV joint is partially inserted onto the powertrain component. In step 81, the assembly operator manually adjusts a distance between the arms of the power tool as necessary in order to engage the power tool with the assembly features (i.e., the bidirectional thrust features) on the CV joint and powertrain component. In step 82, a check is performed to determine whether the operator has triggered the tool operation by pressing the trigger switch. Once the trigger switch is actuated, the power tool begins a contraction phase wherein it selectively applies a compression force to the bidirectional thrust features in step 83.

In step 84, a check is performed to determine whether the plug-in connection of the snap ring interlock has been achieved. The detection can be based on monitoring a force being applied to the components or by monitoring a distance between the arms. For example, the contraction phase of the tool cycle can progress until the separation distance of the arms corresponds to a target distance or until a compression force being applied to the components reaches a predetermined torque or force threshold. A combination of force and distance can also be utilized. When the force or distance being detected indicates that a full insertion has not yet been achieved, then a check is performed in step 85 to determine whether a time-out has occurred (i.e., whether the tool has been in the contraction phase for an excessive amount of time). If a time-out occurs then an error is indicated to the operator in step 86 so that corrective steps can be taken.

When the check performed in step 84 detects a full insertion of the splined shaft coupling which should have been accompanied by the interlocking of the snap ring, then the contraction phase is ended in step 87 and an expansion phase is automatically initiated by the microcontroller in order to verify engagement of the snap ring interlock. Thus, the actuator applies a predetermined expansion force to the bi-directional thrust features. Then a check is performed in step 88 to determine whether an arm movement occurs which would be indicative of a failure to interlock the snap ring. The check may be comprised of sensing a movement of the arms greater than a threshold distance. Alternatively, the failure to obtain an interlock could be sensed in response to the failure of the plug-in coupling to provide a reaction force (i.e., a force resisting the expansion force) greater than a first threshold. If a failure is detected, then an error is indicated in step 89. If no such movement has been detected (or if a sufficient the reaction force is detected), then a check is performed in step 90 to determine whether the expansion force has ramped up to a second predetermined force threshold that ensures that the interlock has engaged (wherein the second predetermined threshold is less than a force sufficient to disengage the snap ring interlock under normal conditions in order to avoid damage to the snap ring interlock). If the force has not finished ramping up, then a return is made to step 88 to continue to monitor for arm movement. Once the force has reached the second threshold in step 90, then the expansion phase is halted in step 91 and an indication of a proper installation may be provided to the assembly operator (e.g., by an indicator light). The operator then removes the power tool and the tool arms can be adjusted for use with the next plug-in CV joint installation.

What is claimed is:

1. Apparatus comprising:
    a plug-in constant velocity (CV) joint attached to a propshaft, wherein the CV joint has a first bi-directional thrust feature accessible from outside the CV joint;
    a rotating powertrain component configured to connect with the CV joint via a splined shaft coupling with a snap ring interlock that engages when the splined shaft coupling is fully inserted, wherein the powertrain component has a second bi-directional thrust feature accessible from outside the powertrain component; and
    power tool having a first arm adapted to engage the first bi-directional thrust feature and a second arm adapted to engage the second bi-directional thrust feature after the splined shaft coupling is partially inserted, wherein the arms are relatively movable along a longitudinal direction, wherein the power tool includes an actuator selectively applying a compression force to the bi-directional thrust features adapted to fully insert the splined shaft coupling and engage the snap ring interlock by contracting the first and second arms, wherein the power tool monitors the compression force to detect the full insertion, wherein the actuator automatically applies a predetermined expansion force to the bi-directional thrust features to verify engagement of the snap ring interlock, and wherein the predetermined expansion force is less than a force sufficient to disengage the snap ring interlock.

2. The apparatus of claim 1 wherein the power tool includes a force sensor for detecting engagement of the snap ring interlock in response to a reaction force opposing the contraction being greater than a threshold.

3. The apparatus of claim 1 wherein the power tool detects relative movement of the arms during application of the expansion force to detect a failure to engage the snap ring interlock.

4. The apparatus of claim 1 wherein the power tool includes a trigger switch for manually selecting the application of the compression force.

5. The apparatus of claim 1 wherein a distance between the first and second arms is manually adjustable to align the arms with the bi-directional thrust features when the splined shaft coupling is partially inserted.

6. The apparatus of claim 1 wherein the first bi-directional thrust feature is comprised of a raised flange encircling the CV joint, and wherein the first arm includes an arcuate cradle to engage the flange.

7. The apparatus of claim 1 wherein the second bi-directional thrust feature is comprised of a socket, and wherein the second arm includes a post to engage the socket.

8. The apparatus of claim 1 wherein is snap ring interlock is comprised of a circlip.

9. A method of installing a plug-in constant velocity (CV) joint to a rotating powertrain component, wherein the CV joint is attached to a propshaft, comprising the steps of:
    configuring a first bi-directional thrust feature on an outside surface of the CV joint;
    configuring a second bi-directional thrust feature on an outside surface of the powertrain component, wherein the rotating powertrain component and CV joint are configured to connect via a splined shaft coupling with a snap ring interlock that engages when the splined shaft coupling is fully inserted;
    manually partially inserting the splined shaft coupling;
    aligning first and second arms extending from a power tool with the first and second bi-directional thrust features;
    engaging the first and second arms onto the first and second bi-directional thrust features, respectively;
    triggering an actuator in the power tool to apply a compression force to the bi-directional thrust features that is adapted to fully insert the splined shaft coupling and engage the snap ring interlock by contracting the first and second arms; and
    after engaging the interlock, automatically applying a predetermined expansion force via the first and second arms to the bi-directional thrust features to verify engagement of the snap ring interlock, wherein the predetermined expansion force is less than a force sufficient to disengage the snap ring interlock.

\* \* \* \* \*